(12) United States Patent
Johnson

(10) Patent No.: US 6,413,126 B1
(45) Date of Patent: Jul. 2, 2002

(54) STEERING MECHANISM FOR JET BOAT

(76) Inventor: Vincent A. Johnson, 768 Hood Ave., Metolius, OR (US) 97741

( * ) Notice: Subject to any disclaimer, the term of this patent is extended or adjusted under 35 U.S.C. 154(b) by 0 days.

(21) Appl. No.: 09/875,576

(22) Filed: Jun. 5, 2001

(51) Int. Cl.[7] .............................................. B63H 11/00
(52) U.S. Cl. ............................ 440/38; 440/42; 440/53; 114/144 R; 114/151
(58) Field of Search ............................. 440/38, 40, 42, 440/53, 62, 63, 64; 114/144 R, 150, 151

(56) References Cited

U.S. PATENT DOCUMENTS

| | | | | |
|---|---|---|---|---|
| 2,895,445 A | * | 7/1959 | Foraker ........................ | 440/62 |
| 2,899,833 A | * | 8/1959 | Prier ........................ | 74/471 R |
| 2,968,192 A | * | 1/1961 | Fletcher ..................... | 74/471 R |
| 3,756,186 A | * | 9/1973 | Nordling ..................... | 440/63 |
| 3,906,885 A | | 9/1975 | Woodfill | |
| 3,976,026 A | | 8/1976 | Eastling | |
| 4,009,678 A | | 3/1977 | North | |
| 4,300,888 A | * | 11/1981 | Warning ....................... | 440/62 |
| 4,311,471 A | * | 1/1982 | Queen ......................... | 440/63 |
| 4,449,420 A | | 5/1984 | Baba | |
| 4,573,930 A | | 3/1986 | Queen | |
| 4,735,165 A | * | 4/1988 | Baba et al. ............... | 114/144 R |
| 4,778,418 A | * | 10/1988 | Mondek ........................ | 440/63 |
| 4,808,131 A | * | 2/1989 | Glen ............................. | 440/63 |
| 4,836,812 A | | 6/1989 | Griffiths | |
| 4,909,765 A | | 3/1990 | Riske et al. | |
| 5,108,321 A | | 4/1992 | Nelson | |
| 5,378,179 A | | 1/1995 | Riggle | |
| 5,387,141 A | | 2/1995 | Toyohara | |
| 5,605,110 A | | 2/1997 | Talbot | |
| 5,904,602 A | | 5/1999 | Rumier et al. | |
| 6,224,438 B1 | * | 5/2001 | Hase ............................ | 440/63 |
| 6,336,833 B1 | * | 1/2002 | Rheault et al. ................ | 440/1 |

OTHER PUBLICATIONS

Cablecraft Push–Pull Controls brochure—Tuthill Corporation, Cablecraft Division CA–10 Oct. 1998.

* cited by examiner

Primary Examiner—S. Joseph Morano
Assistant Examiner—Ajay Vasudeva
(74) Attorney, Agent, or Firm—Robert L. Harrington

(57) ABSTRACT

A jet boat having remote steering to enable pivotal side-to-side steering of a steering nozzle from a pilot seat. A primary coupling between the steering wheel and the steering nozzle. A first pivot arm pivoted by the side-to-side steering of the steering nozzle. A trolling motor mounted pivotally to the rear of the boat and a push/pull cable assembly between the first pivot arm and the trolling motor for corresponding side-to-side pivotal steering of the trolling motor.

5 Claims, 4 Drawing Sheets

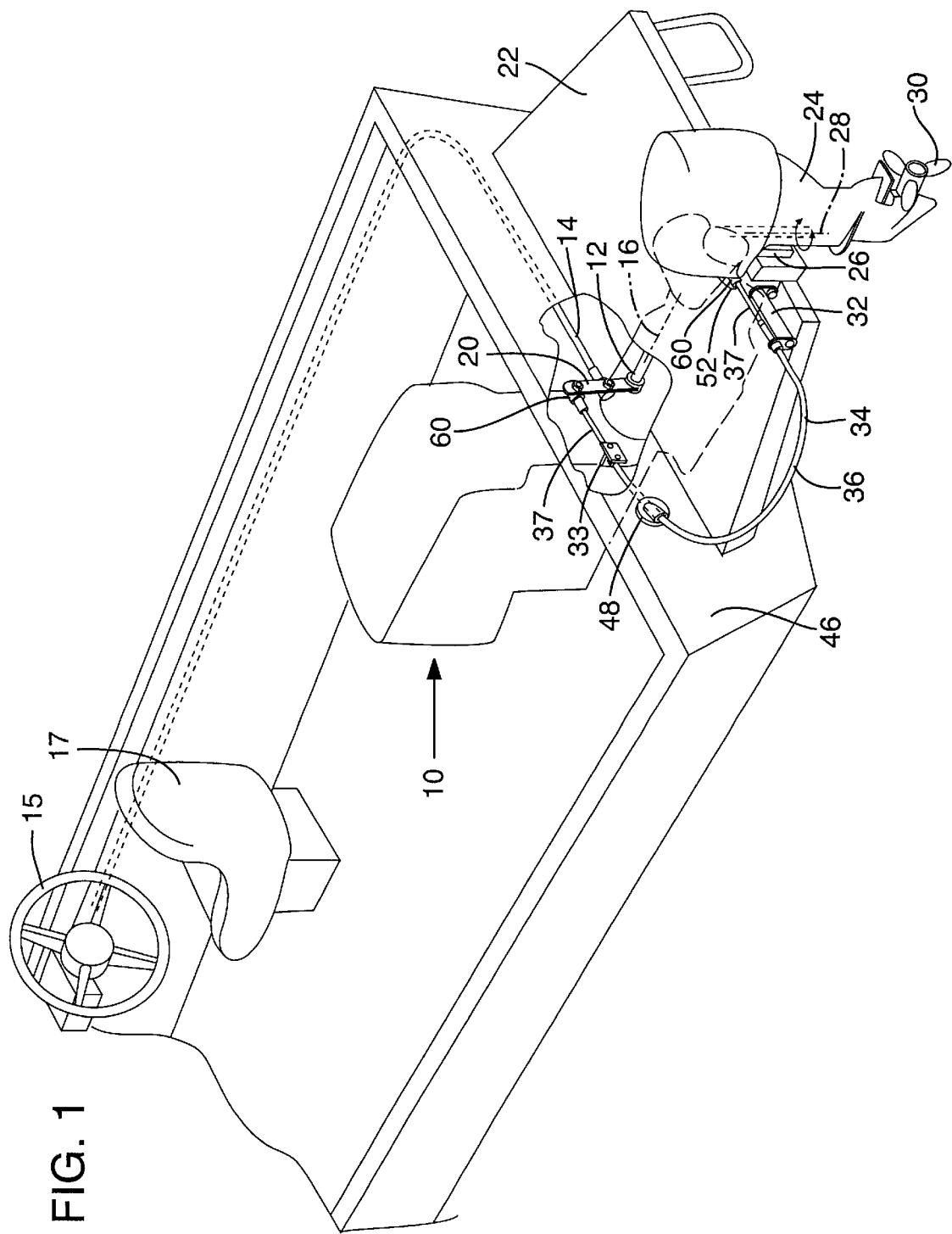

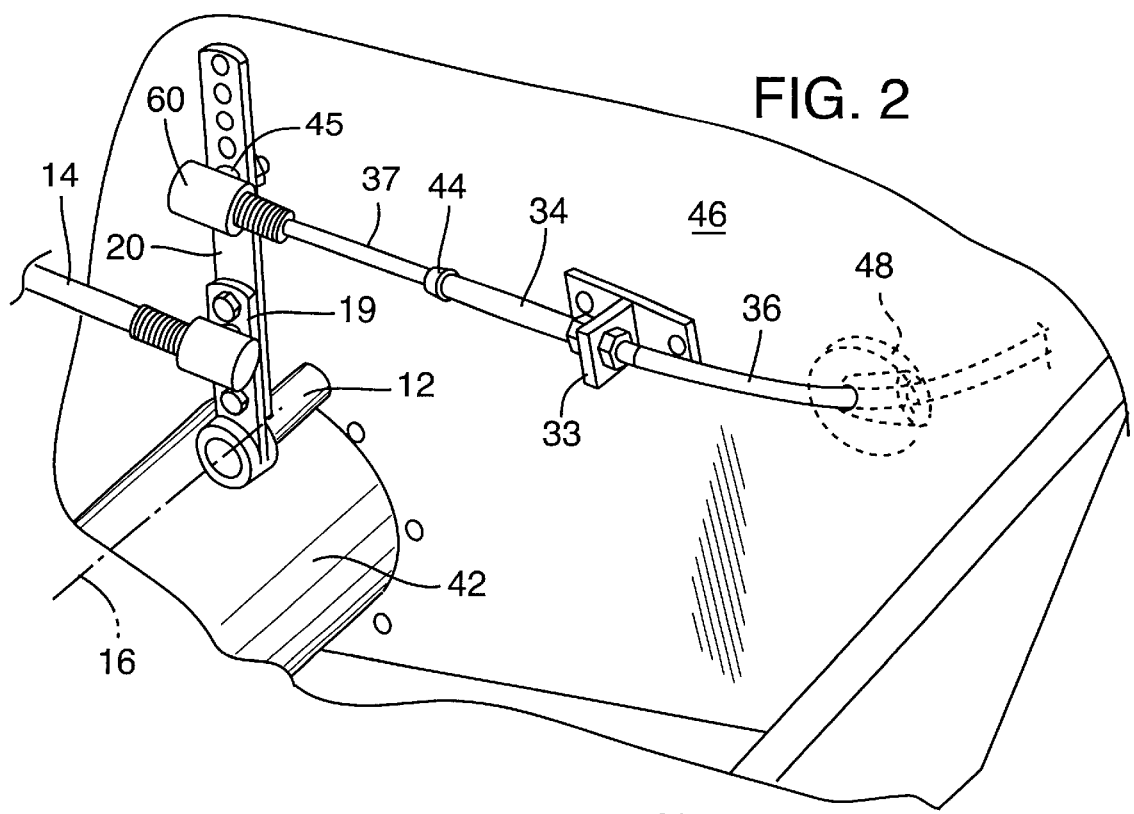
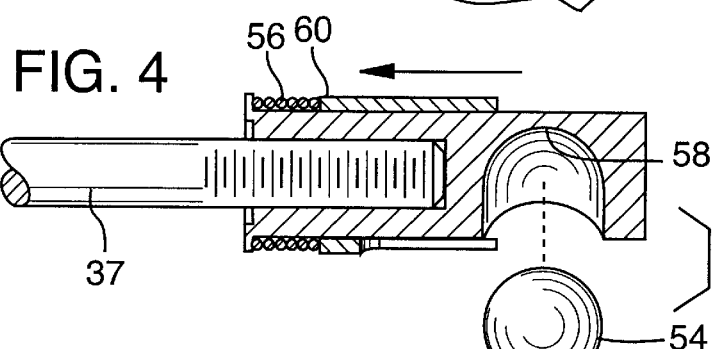
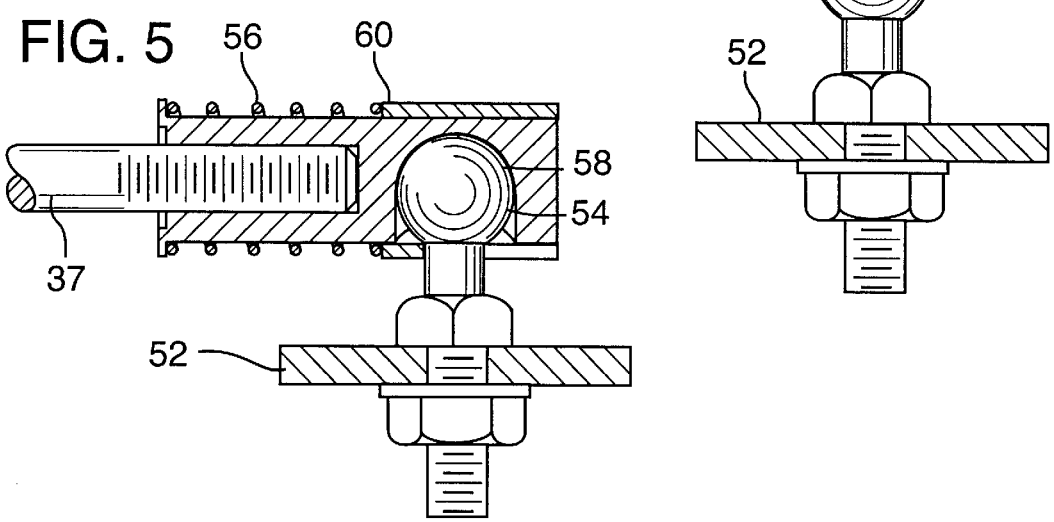

US 6,413,126 B1

STEERING MECHANISM FOR JET BOAT

FIELD OF THE INVENTION

This invention relates to a steering mechanism enabling a jet boat operator to steer the boat from the pilot seat when the boat is driven alternatively by a trolling motor.

BACKGROUND OF THE INVENTION

It is desirable for a boat owner to be able to operate his boat for both high speed recreation, e.g., water skiing, and low speed recreation, e.g., trolling for fish. The high power engine necessary for high speed recreation is not desirable for slow speed use and it is common to fit such a boat with an auxiliary small motor (referred to as a trolling motor) that operates more smoothly, more efficiently and more quietly at speeds, e.g., below 10 miles per hour.

As particularly relates to jet boats when driven by the faster jet motor, steering is accomplished from a pilot seat toward the front of the boat. Upon shifting to the trolling motor, the driver must relocate to the rear of the boat where the smaller trolling motor is steered directly by pivoting the motor.

It is an objective of the present invention to provide a linkage or coupling from the steering mechanism for the jet motor to the trolling motor to enable steering of the trolling motor from the pilot seat via the jet boat steering wheel.

BRIEF DESCRIPTION OF THE INVENTION

A jet boat operates in general by pumping water out the rear of the boat through a steering nozzle. Steering of the boat is accomplished by pivoting the nozzle from side to side and control over such pivoting is achieved by a coupling that extends from the pilot station (including a pilot chair and steering wheel) at the front of the boat, to the steering nozzle at the rear of the boat. The steering wheel is turned as in a vehicle and that turning is converted by the coupling to pivotal side-to-side movement of the steering nozzle.

A small outboard motor (trolling motor) mounted on the rear of the boat includes a motor mount that is rigidly secured to the rear of the boat. The motor itself is pivotally mounted to the motor mount in that the motor can be pivoted about a vertical axis relative to the motor mount. A drive propellor is extended from the motor into the water at the rear of the boat and is directionally controlled by pivoting of the motor. Typically a handle extended forwardly from the motor is gripped by an operator sitting just forward of the motor mount and by moving the handle in a horizontal arc about the vertical axis, the operator controls fine steering of the boat when propelled by the trolling motor.

The inventor determined that if he could couple the steering motion of the steering nozzle to the trolling motor, he could similarly control the steering of the trolling motor, i.e., via the steering wheel at the pilot station.

Steering is achieved by pivotal action for both the steering nozzle of the jet boat and the trolling motor. However, there is no practical way to generate a rigid link between the steering nozzle and the trolling motor. Accordingly, the inventor derived a concept or (a) converting the pivotal motion of the steering nozzle to linear motion, (b) transmitting the linear motion via a push/pull control cable to the trolling motor and (c) converting the linear motion back to pivotal motion as required for corresponding pivotal motion of the trolling motor.

The pivotal motion of the steering nozzle encompasses the coupling mechanism between the steering wheel and the steering nozzle. For example, a shaft is sometimes used to actuate pivoting of the nozzle. The shaft restrictively turns about its axis, back and forth, within an angular range of, e.g., 90 degrees. In response to such back and forth turning, the steering nozzle is correspondingly pivoted from side to side to effect turning. An arm clamped to the shaft will pivot within the same angular range, e.g., 90 degrees.

Alternatively, the direct pivotal action of the steering nozzle may be used by fixing an arm to the nozzle so that it pivots in direct relation to the steering nozzle.

It is here explained that different makes of jet boats present different structures that have to be accommodated. A suitable pivotal arm may be a component of the existing structure but likely one needs to be generated, e.g., by fixing an arm member to a movable component, the movable component either generating the steering motion of the steering nozzle, the movable component being the steering nozzle itself or the movable component being responsive to the steering motion of the steering nozzle. Further, with each make and model of a jet boat, the pivotal arm to be created must be located so as to avoid interference with other components of the boat as it is pivoted through a full range of steering motion.

For the preferred embodiment of the invention, it is desirable for the distal end of the pivotal arm to have a throw distance (a linear distance measured from extreme clockwise to extreme counter clockwise locations of the distal end) of about six inches. The pivotal motion of the arm is converted to linear motion (as much as six inches) that is transmitted to the location of the trolling motor via a push/pull control cable assembly.

The push/pull control cable assembly as utilized in the preferred embodiment of this invention includes an elongate flexible sleeve and a flexible slide member that slides through the sleeve and is connected at each end to a rigid rod which projects from the sleeve ends. Whereas the body of the cable is flexible and can be formed into a variety of curved shapes through which the slide member readily slides, the ends defined by the rigid rods produce a linear force as extended from the sleeve. Such a control cable is available from the Cablecraft Division of Tuthill Corporation in Tacoma, Wash. and is advertised for transmitting linear motion applicable to throttles, clutches, latches, hitches, chokes, shifter valves, dumps and PTO (power take off).

The sleeve end of the cable assembly is fixedly mounted to the boat proximal to the distal end of the pivot arm with the rod end pivotally attached to the distal end of the pivot arm. Thus, pivoting of the pivot arm pulls and pushes the rigid rod into and out of the sleeve. The slidable member within the major length of the sleeve correspondingly slides back and forth within the sleeve and forces the rigid rod at the opposite end into and out of that sleeve end. (Into and out of the sleeve end has reference only to the exposed portion of the rod end as an inner portion of the rod end is retained inside the sleeve throughout the in and out sliding motion.) The cable length can be made to whatever length is needed to run the cable from its end location proximal to the pivot arm to the location of the trolling motor at the back of the boat.

The trolling motor as desired is steered by pivoting the motor relative to the motor mount. A bracket, arm or brace, existing or added or even part of the motor housing, is established as the desired pivotal connection for the push/pull rod based on the desired pivoting of the motor to achieve full left to full right turning of the motor. That is, assuming the rod will movably project from the sleeve and as much as six inches, such must be matched to the desired throw distance of the established point of pivotal connection, i.e., when pivoting the motor from full right to full left turn. This may be accomplished simply by using the same length of pivot arm at both ends of the cable to achieve a similar angle of pivoting as between the steering nozzle and trolling motor. In some cases, however, the angle of pivoting may differ, e.g., the steering nozzle at 90 degree pivoting may be best matched to a 110 degree pivoting of the motor. Different pivot arm lengths will accommodate such differences.

The above explanations will be more fully understood upon reference to the following detailed description of the preferred embodiment.

DESCRIPTION OF THE DRAWINGS

FIG. 1 is a pictorial view of a jet boat incorporating the invention;

FIG. 2 is a more detailed view of a manner of coupling a push/pull cable assembly to the steering mechanism of the jet boat of FIG. 1;

FIGS. 4 and 5 illustrate a quick connect-disconnect as between the piston rod and the motor bracket.

DETAILED DESCRIPTION OF THE INVENTION

Figure 2A:
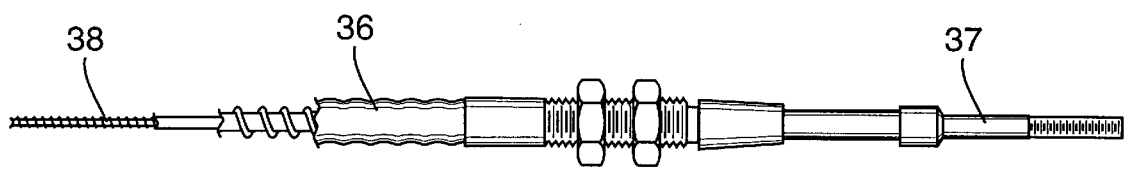
FIG. 2A is a sectional view of the push/pull cable assembly used in the embodiment of FIG. 1.

FIG. 1 illustrates the rear end of a jet boat having jet motor 10 and including a steering rod 12 that is rotated to achieve pivotal movement of a steering nozzle as typical for steering a jet boat. Steering is achieved through a primary coupling 14 that extends from the steering wheel 15 at the front of the boat manipulated by an operator/pilot seated in a pilot seat 17.

As a result of the steering wheel 15 being turned by the boat's operator, a lever arm 19 (see FIG. 2) is pivoted to thereby rotate steering rod 12 about its axis 16. A divot arm extension 20 is fixedly secured to the arm 19 so that turning of the rod 12 produces pivotal movement of the pivot arm extension 20. Such turning of the rod 12 is in the order of 90 degrees and thus pivoting of the pivot arm 20 pivots the arm from a vertical position as shown to 45 degrees at either side of vertical. This angular rotation may be different for different applications and a range of angular motion will likely vary between 60 degrees and 120 degrees.

Figure 3:
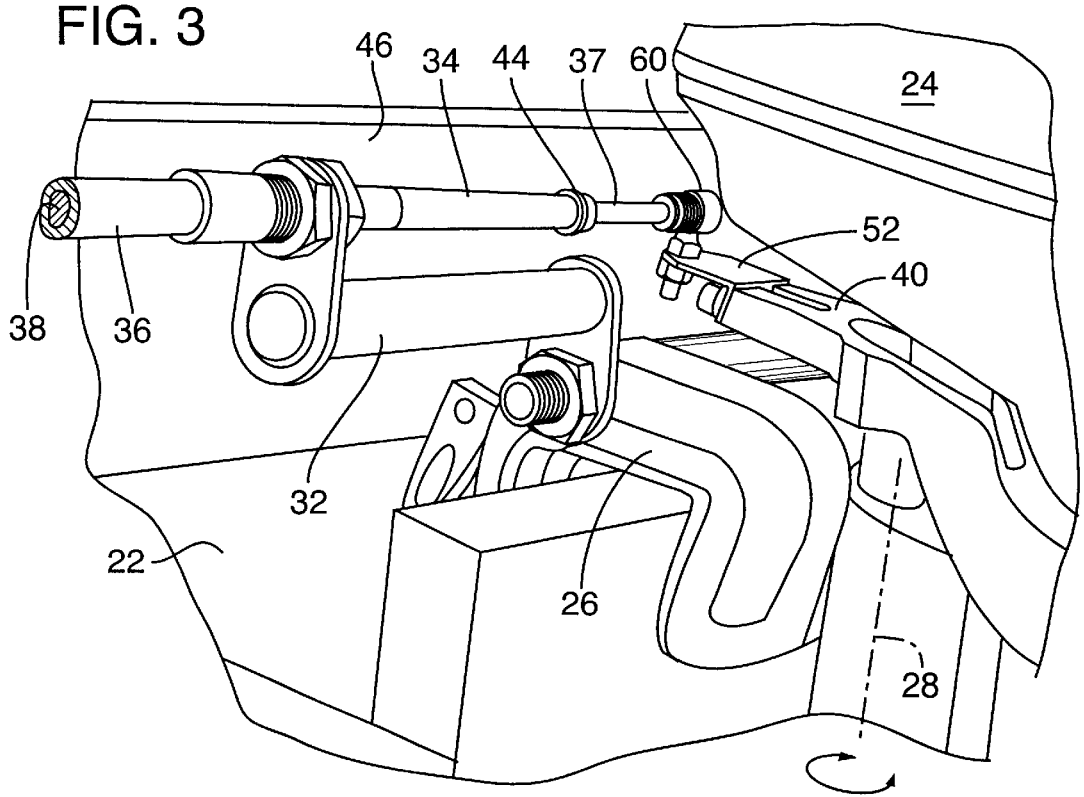
FIG. 3 is an enlarged view of the push/pull cable assembly coupled to a trolling motor.

Referring to FIGS. 1 and 3, a deck 22 is shown at the rear of the boat and is typical for jet boats. Mounted to the deck 22 is a trolling motor 24. The motor includes a motor mount 26 which provides a vertical pivotal axis 28 around which the trolling motor 24 is pivoted (note arrows). The motor mount 26 remains fixedly secured to the boat. A propellor 30 is extended downward from the motor 24 into the water and is driven by the motor 24 for propelling the boat. Turning the motor about axis 28, i.e., relative to the motor mount 26 and thus relative to the boat, changes the propellor direction relative to the boat which produces steering of the boat when propelled by the trolling motor.

A pivot arm for the trolling motor is provided by bracket 40 and extension plate 52 and pivotal movement of motor 24 around axis 28 is thus achieved through horizontal pivoting of the bracket 40 and extension plate 52 as will be explained.

As illustrated also in FIG. 3, a bracket 32 is mounted to the motor mount 26 and is thus also fixed relative to the boat. It is strategically positioned proximal to extension plate 52. A further bracket 33 (FIGS. 1 and 2) is mounted fixedly to the boat inside the hull and proximal to the distal end of the pivot arm extension 20. A push/pull cable assembly 34 provides a coupling between bracket 32 and bracket 33 and is illustrated in detail in FIG. 2A. The push/pull cable assembly includes a sleeve 36 and sliding member 38 that move back and forth inside the sleeve 36 and is fixedly connected at each end of the sleeve 36 to a rod end 37. The push/pull cable assembly can be purchased from the Cablecraft Division of Tuthill Corporation, Tacoma, Wash. and then retrofitted with the desired connecting features. The ends of the sleeve 36 are secured to the brackets 32, 33 and the rod ends 37 are connected to the pivot arm 20 and to extension 52.

The rotation of the jet motor steering rod 12 (by steering wheel 15) produces pivoting of pivot arm extension 20 which forces linear sliding of sliding member 38 and thus rod end 37. Such in and out movement of the rod end 37 is transmitted to the bracket 40 of motor 24 and thus produces pivoting of the motor 24 and the propeller 30 associated therewith.

FIG. 2 illustrates in greater detail the jet boat turbine 42 and the steering rod 12 within the boat hull. As already explained, in general, bar 19 is clamped to steering rod 12 and coupler 14 is connected to bar 19 for primary steering of the boat when driven by the jet motor. Extension arm 20 is secured to bar 19 and pivots with bar 19 as dictated by the primary coupler 14 The sleeve 36 of the push/pull cable assembly 34 is fixed to the wall 46 of the boat by bracket 33. The rod end 37 is slidable inside an end portion of sleeve 36 and projects through wiper 44 at the end of sleeve 36 and then is pivotally connected at sleeve 45 to arm 20. It will thus be appreciated that pivoting of bar 19 by the coupler 14 causes pivotal displacement of arm 20 which in turn causes linear movement of piston rod 37 and thus sliding movement of slide member 38 through sleeve 33.

FIGS. 1 and 3 show the opposite side of wall 46. Note from FIG. 1 that the coupling (push/pull cable assembly 34) passes through wall 46 enabled by portal 48. As illustrated, upon emerging from portal 48 the coupling 34 is curved to extend back toward motor 24. The mounting bracket 32 is fixed to the non-pivotal motor mount 26 and extends laterally from the motor mount to anchor the sleeve 36 of push/pull cable assembly 34 at a desired location relative to extension plate 52. As best seen in FIG. 3, the sleeve 36 is fixed to bracket 32 which prevents movement of the sleeve end. The rod end 37 extends out of the sleeve and is releasably and pivotally connected to a releasable coupling 60 of extension plate 52 provided on motor bracket 40.

The releasable coupling 60 is further illustrated in FIGS. 4 and 5. The coupler plate 52 mounted to bracket 40 (FIG. 3) is provided with a ball end 54. Rod 37 is provided with a sliding lock-type connector 60. A slide lock portion of the connector 60 is spring biased by spring 56 to close the receiving socket 58 in the connector and is opened manually by sliding the sliding portion of connector 60 as indicated by the arrow in FIG. 4. Thus, simply sliding the sliding portion of connector 60 allows insertion or removal of the ball 54 relative to socket 58 and thus universal connection or disconnection of the piston rod 38 from motor mount 40. This quick disconnect allows the trolling motor to be readily disengaged or disconnected as when using the boat for high speed recreation. However, the rod end 37 may or may not be disconnected from the motor mount as desired. The benefit of disconnecting the primary steering mechanism from the trolling motor is to eliminate the steering drag of the trolling motor when driving with the jet motor. A similar quick connect can be provided for the other end of the push/pull cable assembly where the rod end 37 connects to extension arm 20 as will be noted in FIG. 2.

Figure 6:
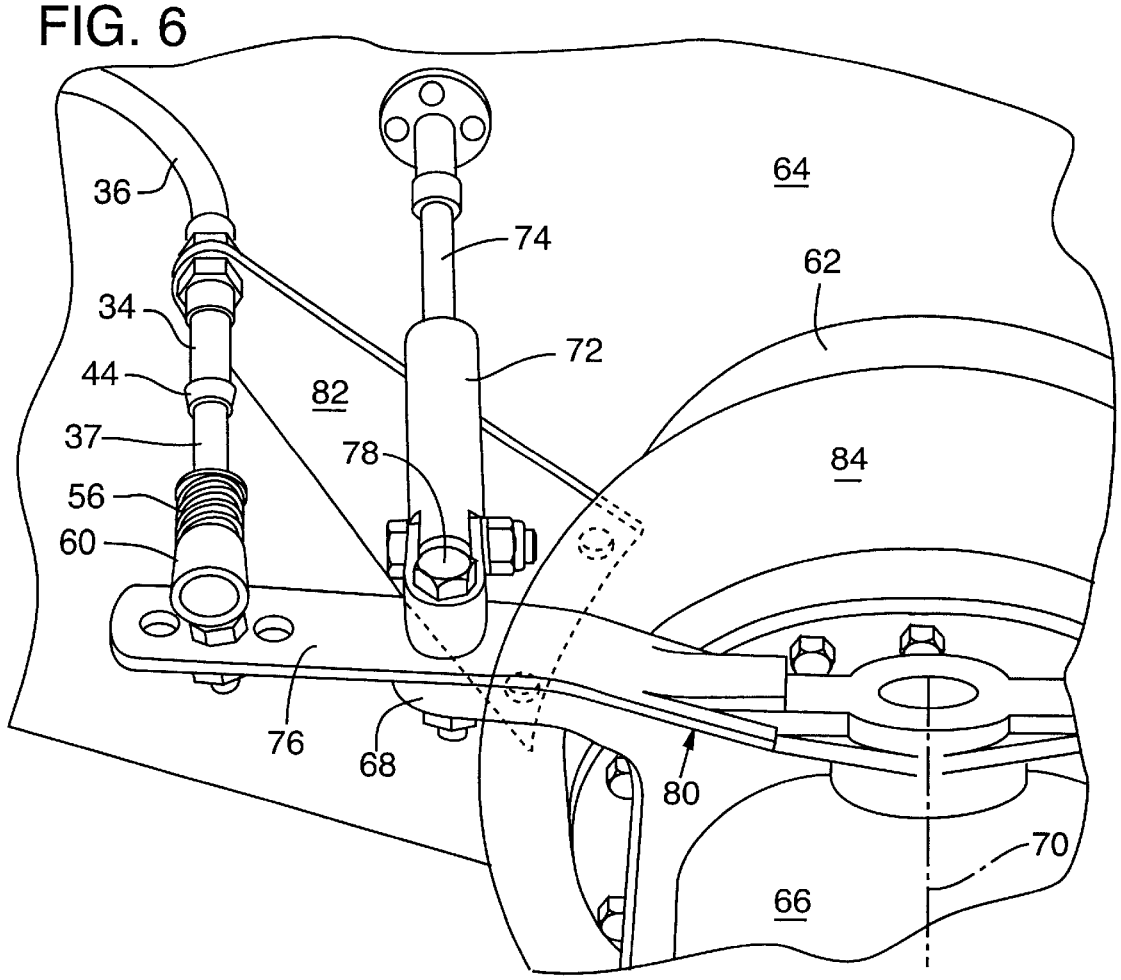
FIGS. 6 and 6A are perspective and top views, respectively, of an alternate embodiment of the invention.
Figure 6A:
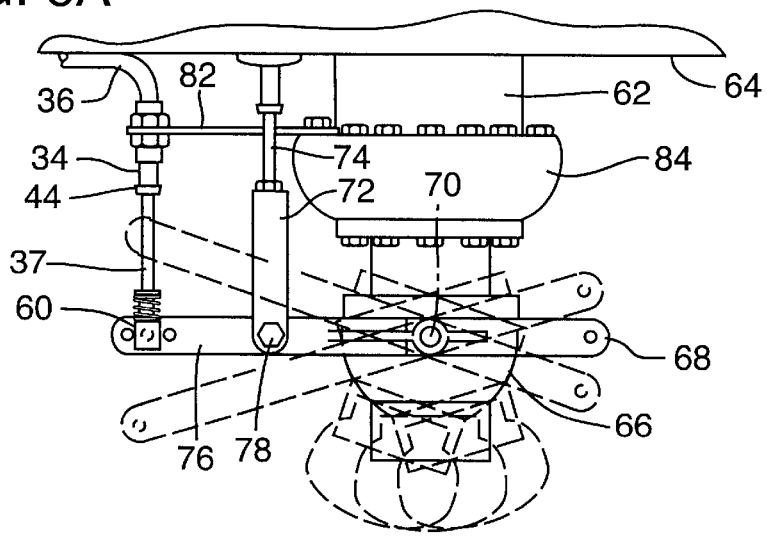

FIGS. 6 and 6A illustrate a different type of steering mechanism used in a jet boat for manipulating the boat's steering nozzle. Shown in FIG. 6 is a water pump 62 extended rearwardly from a support wall 64. A steering nozzle 66 having a flange 68 is pivoted around axis 70. A primary steering mechanism 72 projected through wall 64 extends from the steering wheel (see reference 15 in FIG. 1) and is bolted to flange 68. Rod 74 of the steering actuator 72 extends and retracts to pivot flange 68 and thereby steering nozzle 66 about axis 70 in response to the driver turning steering wheel 15.

It will be apparent that bolt 78 has been removed, bracket 76 inserted between the actuator 72 and flange 68 and then resecured to attach the bracket 76 to the flange 68. The bracket 76 is configured as shown at 80 to interlock bracket 76 with flange 68 but of course there are multiple ways of achieving such an interlock. The objective is to secure the bracket 76 for pivotal motion corresponding to the pivotal motion of flange 68 as controlled by actuator 72. An objective of the pivot arms and points of connection is to provide the arc of movement of the distal end of bracket 76 with about a six inch movement. This is accomplished by providing a desired length of extension 76 establishing a pivot arm from axis 70 to connector 60.

As illustrated, a further bracket 82 is mounted to the fixed flange 84 of the water pump 62 and is extended to a position aligned with and in spaced relation to the distal end of bracket 76. Bracket 82 receives and secures the sleeve 36 of the push/pull cable assembly 34 and the end rod 37 is releasably connected to the distal end of bracket 76, e.g., via releasable connection 60. Thus, pivotal movement of the steering nozzle 66 correspondingly pivots bracket 76 and forces linear movement of end rod 37 into and out of the sleeve 36. The opposite end is connected to the trolling motor in a manner similar to the illustration of FIG. 3.

The reader will understand that there are numerous forms and shapes and points of connection that may be suitable for the brackets and pivot arms shown by way of sample in the illustrations of FIGS. 1–6. The invention broadly applies to the concept of identifying a pivotal motion that affects or is responsive to the steering of the steering nozzle of the jet boat and which is located in the rear of the boat. The pivotal arm is then generated from that pivotal motion that produces a measured linear movement of a desired distance, e.g., six inches. A bracket is generated for securing a sleeve end of a push/pull cable assembly and a rod end thereof is attached to the pivot arm.

The push/pull cable assembly is then extended to a position adjacent the trolling motor. A pivot arm is generated for the motor having a distal end that will pivot through an arc that produces the desired distance for steering the trolling motor. The rod ends as desirably secured to the respective arms will coordinate the turning of the steering nozzle with the turning of the trolling motor, i.e., they will reach maximum left turn and maximum right turn at the same time (approximate positions being acceptable).

It will accordingly be understood that numerous coupling arrangements are possible for any particular jet boat let alone for different types and models of jet boats. Such variations are considered within the capability of persons skilled in the art upon obtaining an appreciation of the teaching herein. In its simplest form the invention encompasses the matching of pivot arm movements strategically formed relative to the steering nozzle and trolling motors and coupling the pivot arm movements via the linear transmission of a push/pull cable assembly. Accordingly, the claims as appended hereto are intended to encompass such variations and are to be broadly interpreted.

The invention claimed is:

1. A jet boat comprising:

a jet boat engine including a water pump and a steering nozzle through which water from the pump is ejected;

a pilot station including a steering wheel, a primary coupling between the steering wheel and steering nozzle, said nozzle mounted for side-to-side pivoting as dictated by said coupling in response to turning of the steering wheel;

one of said primary coupling and said steering nozzle provided with a first pivot arm that is cooperatively pivoted with side-to-side pivoting of said steering nozzle;

a motor mount mounted to the rear end of the jet boat, a trolling motor pivotally mounted about a vertical axis to the motor mount and including a drive propeller extending into the water and directionally manipulated through pivoting of the motor relative to said motor mount and accordingly relative to the boat, said trolling motor having a second pivot arm; and a push/pull coupling between said first and second pivot arms converting the pivotal motion of said first pivot arm to linear motion and then to pivotal motion of said second pivot arm, said first and second pivot arms and said push/pull coupling cooperatively arranged to produce common right to left turning of the steering nozzle and trolling motor.

2. A jet boat as defined in claim 1 wherein the push/pull coupling is a push/pull cable assembly comprising a flexible sleeve having opposed open ends, a flexible slide member slidable within the sleeve and rigid rod ends projected out of each open end of the sleeve, the push/pull cable assembly being flexible throughout the major portion of its length and mountable in curved orientation while allowing free sliding motion of the slide member for linear sliding of the rigid rod from the respective sleeve ends, each end of the sleeve being anchored relative to the boat adjacent the first and second pivot ends, and the rod ends secured to the respective first and second pivot arms for common pivotal movement of the pivot arms.

3. A jet boat as defined in claim 2 wherein one of said rod ends is secured by a quick connect and disconnect device whereby the steering control for the trolling motor can be readily disconnected.

4. A jet boat as defined in claim 1 wherein said primary coupling includes a shaft rotated about its elongate axis and as rotated producing side-to-side pivoting of said steering nozzle, said first pivot arm fixed to said rotatable shaft and producing pivoting of said first pivot arm as said shaft is rotated.

5. A jet boat as defined in claim 1 wherein said first pivot arm is fixed to said steering nozzle and pivoted upon side-to-side pivoting of said steering nozzle.

\* \* \* \* \*